United States Patent
Ganesh et al.

(10) Patent No.: US 10,229,089 B2
(45) Date of Patent: Mar. 12, 2019

(54) EFFICIENT HARDWARE INSTRUCTIONS FOR SINGLE INSTRUCTION MULTIPLE DATA PROCESSORS

(71) Applicant: Oracle International Corporation, Redwood Shores, CA (US)

(72) Inventors: Amit Ganesh, San Jose, CA (US); Shasank K. Chavan, Menlo Park, CA (US); Vineet Marwah, San Ramon, CA (US); Jesse Kamp, Castro Valley, CA (US); Anindya C. Patthak, Fremont, CA (US); Michael J. Gleeson, Saratoga, CA (US); Allison L. Holloway, San Carlos, CA (US); Roger Macnicol, Hummelstown, PA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 15/639,110

(22) Filed: Jun. 30, 2017

(65) Prior Publication Data

US 2017/0300455 A1    Oct. 19, 2017

Related U.S. Application Data

(63) Continuation of application No. 14/023,249, filed on Sep. 10, 2013, now Pat. No. 9,697,174, which is a
(Continued)

(51) Int. Cl.
*G06F 9/30*    (2018.01)
*G06F 15/80*    (2006.01)
*G06F 17/30*    (2006.01)

(52) U.S. Cl.
CPC ...... *G06F 15/8007* (2013.01); *G06F 9/30036* (2013.01); *G06F 17/30315* (2013.01)

(58) Field of Classification Search
None
See application file for complete search history.

(56) References Cited

U.S. PATENT DOCUMENTS

RE34,052 E    9/1992 Hester et al.
5,423,010 A    6/1995 Mizukami
(Continued)

FOREIGN PATENT DOCUMENTS

EP    2423843 A1    2/2012
JP    2000261674 A    9/2000
(Continued)

OTHER PUBLICATIONS

Zhou et al., "Efficient SIMD Optimization for Media Processors", Journal of Zhejiang University Science A, dated Apr. 2008, 7 pages.
(Continued)

*Primary Examiner* — George Giroux
(74) *Attorney, Agent, or Firm* — Hickman Palermo Becker Bingham LLP

(57) ABSTRACT

A method and apparatus for efficiently processing data in various formats in a single instruction multiple data ("SIMD") architecture is presented. Specifically, a method to unpack a fixed-width bit values in a bit stream to a fixed width byte stream in a SIMD architecture is presented. A method to unpack variable-length byte packed values in a byte stream in a SIMD architecture is presented. A method to decompress a run length encoded compressed bit-vector in a SIMD architecture is presented. A method to return the offset of each bit set to one in a bit-vector in a SIMD architecture is presented. A method to fetch bits from a bit-vector at specified offsets relative to a base in a SIMD architecture is presented. A method to compare values stored in two SIMD registers is presented.

20 Claims, 7 Drawing Sheets

Related U.S. Application Data continuation-in-part of application No. 13/708,054, filed on Dec. 7, 2012, now Pat. No. 8,572,131.

(60) Provisional application No. 61/801,207, filed on Mar. 15, 2013, provisional application No. 61/709,142, filed on Oct. 2, 2012, provisional application No. 61/568,644, filed on Dec. 8, 2011.

(56) References Cited

U.S. PATENT DOCUMENTS

| | | | |
|---|---|---|---|
| 5,511,190 A | 4/1996 | Sharma et al. | |
| 5,581,705 A | 12/1996 | Passint et al. | |
| 5,655,080 A | 8/1997 | Dias et al. | |
| 5,706,495 A | 1/1998 | Chadha Atul et al. | |
| 5,887,183 A | 3/1999 | Agarwal | |
| 5,884,229 A | 5/1999 | Ramesh et al. | |
| 5,933,650 A | 8/1999 | Van Hook | |
| 5,987,407 A | 11/1999 | Wu | |
| 6,006,179 A | 12/1999 | Wu | |
| 6,108,633 A * | 8/2000 | Kolluru | G10L 19/0208 704/270 |
| 6,317,824 B1 | 11/2001 | Thakkar et al. | |
| 6,381,601 B1 | 4/2002 | Fujiwara et al. | |
| 6,671,797 B1 | 12/2003 | Golston | |
| 6,745,174 B2 | 6/2004 | Levy et al. | |
| 6,829,697 B1 | 12/2004 | Davis et al. | |
| 6,842,848 B2 | 1/2005 | Hokenek et al. | |
| 6,996,569 B1 | 2/2006 | Bedell et al. | |
| 7,047,252 B2 | 5/2006 | Buch et al. | |
| 7,725,595 B1 | 5/2010 | Geissler et al. | |
| 7,861,060 B1 | 12/2010 | Nickolls et al. | |
| 7,991,794 B2 | 8/2011 | Bedi et al. | |
| 8,260,803 B2 | 9/2012 | Hsu et al. | |
| 8,285,709 B2 | 10/2012 | Candea et al. | |
| 8,521,788 B2 | 8/2013 | Ellison et al. | |
| 8,533,216 B2 | 9/2013 | Buger et al. | |
| 8,543,534 B2 | 9/2013 | Alves et al. | |
| 8,572,131 B2 | 10/2013 | Ellison et al. | |
| 8,667,252 B2 | 3/2014 | Colavin et al. | |
| 8,725,707 B2 | 5/2014 | Chen et al. | |
| 8,938,644 B2 | 1/2015 | Clark et al. | |
| 8,996,463 B2 | 3/2015 | Merriman et al. | |
| 2001/0037345 A1 | 11/2001 | Kiernan | |
| 2002/0032678 A1 | 3/2002 | Cornwell et al. | |
| 2002/0184392 A1 | 12/2002 | Parthasarathy et al. | |
| 2002/0188830 A1 | 12/2002 | Boles et al. | |
| 2003/0167460 A1 | 9/2003 | Desai | |
| 2003/0187858 A1 | 10/2003 | Kirk et al. | |
| 2004/0030863 A1 | 2/2004 | Paver | |
| 2004/0221192 A1 | 11/2004 | Motta | |
| 2005/0091256 A1 | 4/2005 | Rathakrishnan et al. | |
| 2005/0177706 A1 | 8/2005 | Lee | |
| 2006/0116989 A1 | 6/2006 | Bellamkonda et al. | |
| 2008/0046686 A1 | 2/2008 | Cameron | |
| 2009/0055350 A1 | 2/2009 | Branish et al. | |
| 2009/0094193 A1 | 4/2009 | King et al. | |
| 2009/0225904 A1 * | 9/2009 | Lee | H04L 27/22 375/329 |
| 2009/0287628 A1 | 11/2009 | Indeck | |
| 2009/0287637 A1 | 11/2009 | Day et al. | |
| 2009/0313210 A1 | 12/2009 | Bestgen et al. | |
| 2010/0030728 A1 | 2/2010 | Chakkappen et al. | |
| 2010/0082705 A1 | 4/2010 | Bhashyam et al. | |
| 2010/0088309 A1 | 4/2010 | Petculescu et al. | |
| 2010/0115347 A1 | 5/2010 | Noyes | |
| 2010/0161646 A1 | 6/2010 | Ceballos et al. | |
| 2012/0054225 A1 | 3/2012 | Marwah et al. | |
| 2012/0166447 A1 | 6/2012 | Nice | |
| 2012/0197868 A1 | 8/2012 | Fauser | |
| 2012/0209873 A1 | 8/2012 | He | |
| 2014/0013076 A1 | 1/2014 | Ganesh et al. | |
| 2014/0013078 A1 | 1/2014 | Ganesh et al. | |
| 2014/0052713 A1 | 2/2014 | Schauer et al. | |
| 2014/0052726 A1 | 2/2014 | Amberg et al. | |
| 2014/0095748 A1 | 4/2014 | Aingaran et al. | |
| 2014/0096145 A1 | 4/2014 | Aingaran et al. | |
| 2016/0350347 A1 | 12/2016 | Das et al. | |
| 2017/0024435 A1 | 1/2017 | Kociubes et al. | |
| 2017/0060587 A1 | 3/2017 | Chavan | |

FOREIGN PATENT DOCUMENTS

| | | |
|---|---|---|
| WO | WO 00/08552 | 2/2000 |
| WO | WO 2013/095653 A1 | 6/2013 |
| WO | WO 2013/095662 A1 | 6/2013 |

OTHER PUBLICATIONS

IBM, "Technical Disclosure Bulletin", Data Packing and Unpacking Scheme for High Performance Image Processing, vol. 36, No. 7, dated Jul. 1993, 6 pages.

Coprocessor Wizard, Platform Studio, http://www.xilinx.com/itp/xilinx10/help/platform_studio/ps_c_cpw_coprocessor_wizard.htm, 2008, 2 pages.

Brewer et al., "Remote Queues: Exposing Message Queues for Optimization and Atomicity", dated Jul. 17, 1995, ACM, 12 pages.

Binkert et al., "A Simple Integrated Network Interface for High-Bandwidth Servers", dated Jan. 2006, 22 pages. Anonymous:, "Hash Table—Wikipedia, the free encyclopedia", dated Jun. 20, 2012, retreived from the internet: http://wayback.archive.org/wiki/harshtable, 18 pages.

* cited by examiner

EFFICIENT HARDWARE INSTRUCTIONS FOR SINGLE INSTRUCTION MULTIPLE DATA PROCESSORS

CROSS-REFERENCE TO RELATED APPLICATIONS; BENEFIT CLAIM

The application claims benefit, as a continuation of U.S. patent application Ser. No. 14/023,249, filed Sep. 10, 2013, issued as U.S. Pat. No. 9,697,174 on Jul. 4, 2017, which claims the benefit of Provisional App. No. 61/801,207, filed Mar. 15, 2013 and of Provisional App. No. 61/709,142, filed Oct. 2, 2012, under 35 U.S.C. § 119(e). U.S. patent application Ser. No. 14/023,249, filed Sep. 10, 2013 also claims priority to a continuation-in-part, of U.S. patent application Ser. No. 13/708,054, filed Dec. 7, 2012, issued as U.S. Pat. No. 8,572,131 B2 on Oct. 29, 2013, which in turn claims priority to Provisional App. No. 61/709,142, filed Oct. 2, 2012, and of Provisional App. No. 61/568,644, filed Dec. 8, 2011. The entire contents of each of these documents are hereby incorporated by reference as if fully set forth herein.

FIELD OF THE INVENTION

The present invention relates to single instruction multiple data instructions, and more specifically to efficient hardware instructions for single instruction multiple data processors.

BACKGROUND

Data formats are designed to enable efficient processing and storage of a variety of different dataset characteristics. Algorithms that process data in these formats are critical. Unfortunately, current processors are not always capable of working with particular data formats efficiently.

Processor designers have historically provided minimal direct support for application specific instructions. Thus, software developers have relied on the increasing speed at which existing processors execute a set of instructions to increase performance of a particular algorithm.

The performance of typical processing units, however, is not increasing at the same rate. Thus, software developers are not able to rely as much on increasing computer power to more quickly process particular data formats.

Single instruction multiple data ("SIMD") processors perform the same operation on multiple data items simultaneously. SIMD processors exploit data level parallelism by executing a single instruction against data in multiple registers or subregisters. Thus, the throughput per instruction may be increased accordingly. SIMD processors are typically used for graphic and other multimedia applications. Accordingly, it may be difficult to use the SIMD architecture to process particular data formats efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

TERMS AND NOTATION

For purpose of explanation, the following terms and conventions are used herein to describe embodiments of the invention:

The term "byte" herein describes number of contiguously stored bits. While the common usage implies eight bits, the size of a byte may vary from implementation to implementation. For example a byte may refer to any size including, but in no way limited to: eight bits, sixteen bits, thirty-two bits, sixty-four bits, and so on.

The notation <XY> herein describes a vector of bits, e.g., <10>. Spaces may be added between bits merely to increase the ability to read the contents of the vector, e.g., <1111 0000 1111 0000>.

The notation [J, K] herein describe a set of contiguous values, where J is a first value and K is a second value, which may be equal or different.

The notation "0x" may be used to denote a hexadecimal number. For example, 0x2C may be used to represent the number forty-four. In some embodiments where bit representations may be unwieldy, hexadecimal representations may be used to increase the ability to read and understand the description.

The term "register" is a register or subregister that may include one or more smaller subregisters. Unless otherwise specified a register may be a SIMD register or a register typically used in the scalar processor.

DETAILED DESCRIPTION

Figure 1:
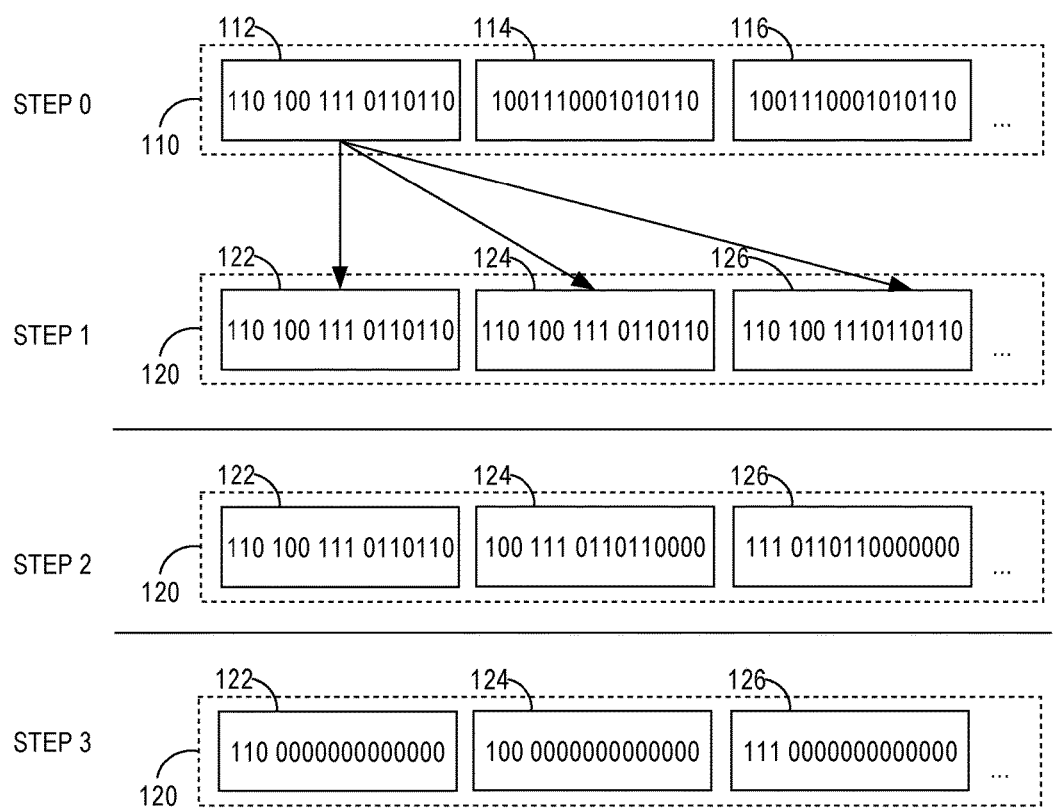
FIG. 1 illustrates a set of SIMD registers and the states of the SIMD registers at various steps of performing a fixed-width bit unpack instruction, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Several instructions are presented for processing particular data formats using SIMD architecture. Specifically, instructions to unpack fixed-width bit values, unpack variable-length byte values, decompress run length encoded bit-vectors, find offsets for bits set to one in a bit-vector, gather particular bits from a bit-vector, and comparing two value-vectors, on a SIMD processor are described.

Many of the instructions presented may be particularly useful for performing operations on particular data formats in memory. The instructions may operate over memory, registers, or immediate operands. Furthermore, instructions with memory operands may operate on data with different degrees of granularity, such as a cache-line or page-sized chunk.

SIMD Instructions

A SIMD instruction is an instruction that, when processed, may cause an operation to be performed multiple times, simultaneously and/or in parallel, on multiple distinct data values. For the purpose of illustrating a clear example, assume four integer values are to be incremented by one. Also assume that a SIMD processor receives a single SIMD Increment by One instruction. In response to receiving the single SIMD instruction, the SIMD processor may increment each of the four integer values simultaneously.

In contrast, a scalar instruction is an instruction that, when processed, may cause an operation to be performed once. Multiple scalar instructions may be processed serially within a scalar processor, processing unit, or processing core. Assume, for purposes of illustrating a clear example, the same four values in the previous example are to be incremented by one on a scalar processor. The scalar processor may execute a first scalar Increment by One instruction, causing the first value to be incremented by one; then, the scalar processor may execute a second scalar Increment by One instruction, causing the second value to be incremented by one, and so on. Thus, in this example, the scalar processor must execute three more Increment by One instructions than the SIMD processor in the previous example. Furthermore, assume that the scalar processor performs a scalar Increment by One instruction as quickly as the SIMD processor executes a SIMD Increment by One instruction. Because the scalar processor performs scalar instructions serially, and the SIMD processor performs a SIMD instruction on multiple data objects in parallel, the scalar processor may take four times longer to process all four values than the SIMD processor.

One approach for implementing a SIMD operation is to use one or more registers that are each capable of storing multiple distinct data values. Such registers are referred to herein as SIMD registers. Assume, for purposes of illustrating a clear example, that a SIMD register is capable of storing 256 bits. Accordingly, the SIMD register is capable of storing eight distinct 32-bit values, each in a 32-bit subregister; four distinct 64-bit values, each in a 64-bit subregister; or two distinct 128-bit values, each in a 128-bit subregister. Additionally or alternatively, non-power-of-two sized subregisters may be used.

A SIMD operation implemented in hardware and may take one or more machine cycles to execute. For example, a scalar processor, in response to receiving an Increment by One instruction, may increment a value loaded into a register in a single cycle. Likewise, a SIMD processor, in response to receiving an Increment by One instruction, may increment multiple values loaded into multiple SIMD registers, or SIMD subregisters, in parallel, in a single cycle. Additionally or alternatively, one or more SIMD instructions may take more than one cycle to execute.

A computer system that implements both SIMD and non-SIMD instructions may include one or more SIMD registers and one or more non-SIMD registers. Additionally or alternatively, a register may be a SIMD register for purposes of executing SIMD instruction and a non-SIMD register for purposes of executing a non-SIMD instruction. Additionally or alternatively, SIMD registers may be on a different hardware element (for example, a different coprocessor) than the hardware element on which non-SIMD registers reside.

Fixed-Width Bit Unpack

A SIMD instruction, fixed-width bit unpack ("bunpk"), may be used to unpack fixed-width bit values into fixed-width bytes. To efficiently use some SIMD instructions, each value in a register may be stored in, and aligned with, its own subregister. Accordingly, this instruction may be used as an enabler for some subsequent SIMD processing by copying each bit-packed value in a bit-vector into, and aligned with, its own subregister.

Specifically, executing this instruction stores values originally formatted as a series of contiguous bits in a SIMD register, into separate contiguous subregisters. Furthermore, each value may be shifted and aligned within the subregister that the value is stored in. For example, the values three, one, and seven may each be represented as three bits, and may be packed in a bit-vector, e.g., <110 100 111> (wherein the left bit is the least significant bit), stored in a SIMD register. After performing the bunpk instruction on the SIMD register, each value may be stored, and aligned, in its own separate subregister represented as <1100 0000>, <1000 0000>, and <1110 0000>.

In an embodiment, the instruction may take as operands: a register or subregister that contains a series of fixed-width bit values; a register containing subregisters that will store the unpacked values; and a register containing the bit-width of each packed value. Alternatively, the register containing the bit-width of each packed value may be an immediate value. Furthermore, a completer may be included, which indicates the size of each subregister the unpacked values will be stored in. A completer is a value that may be part of the instruction. For example, a completer may specify the size of SIMD subregister(s) used. An instruction may have one or more completers. In one embodiment, where "sz" is the completer, the bunpk instruction may be in the form of:

bunpksz s2=s1,r1

As a specific example using the form above:

bunpk2 s2=s1,r1, assuming the value stored in r1 is three, and upon execution of the example, 3-bit values stored contiguously in register s1 may be unpacked into the 2-byte subregisters in s2. Each subregister in s2 may be to be 2 bytes for this instruction because the completer in this example is "2". For example, assume <110 100 111> is stored in register s1. Upon execution of this instruction, the bits stored in the first subregister in s2 would be <1100 0000 0000 0000>, the bits stored in the second subregister in s2 would be <1000 0000 0000 0000>, and the bits stored in the third subregister in s2 would be <1110 0000 0000 0000>.

Alternatively, the second parameter s1 may be the immediate value that represents the packed bits. For example, if 0x01CB is the hexadecimal representation of <110 100 111>, then, bunpk2 s2=0x01CB,r1, may yield the same result as the first example above, in register s2.

In other embodiments, other operands and completers may indicate how the unpacked values may be stored in each subregister. For example, an operand may indicate whether unpacked values should be aligned right or left in a subregister, or the endianness of the data in a register.

Exemplary Process

FIG. 1 illustrates a set of SIMD registers in particular states in various steps of performing a fixed-width bit unpack instruction, in an embodiment. While FIG. 1 illustrates an embodiment for purposes of illustrating a clear example, other embodiments may omit, add to, reorder and/or modify any of the structures or steps shown.

SIMD register 110 comprises subregister 112, subregister 114, and subregister 116; although subregister 112 is discussed in the following example. The spaces in subregister 112 have been included merely to make it easier to follow particular packed bit values. The subregisters in register 110 may be any size; however, for purposes of giving a clear example, and in following the examples above, the subregisters in register 110 are sixteen bits wide.

SIMD register 120 comprises subregister 122, subregister 124, and subregister 126. The spaces in the subregisters of register 120 have been included merely to make it easier to follow particular packed bit values. The subregisters in register 120 may be any size; however, for purposes of giving a clear example, and in following the examples above, the subregisters in register 120 are sixteen bits wide.

In step 0: Subregister 112 is loaded to contain the packed bits about to be unpacked. Notice, just as in the example above, that that first three sets of bits are <110 100 111>, representing values three, one, and seven, respectively. Each value <110>, <100>, <111>, will be unpacked into a corresponding subregister in register 120.

In step 1: A shuffle is performed to copy the packed values into corresponding subregisters to be unpacked. For example, the entire contents of subregister 112, which holds the first three values, are copied and stored in subregister 122, subregister 124, and subregister 126, which are subregisters in SIMD register 120. SIMD register 120 comprises subregister 122 and subregister 124. The subregisters in register 120 may be any size; however, for purposes of giving a clear example, and in following with the examples above, the subregisters in register 120 are sixteen bits wide.

In step 2: A shift is performed to align each unpacked value to its respective target subregister. Accordingly, subregister 122 is not shifted at all since <110> is already aligned with the beginning of subregister 122. Subregister 124 is shifted three bits, such that <100> is aligned with the beginning of subregister 124. Subregister 126 is shifted six bits, such that <111> is aligned with the beginning of subregister 126. In the embodiment illustrated in FIG. 1, the values are aligned to the left. In other embodiments, alignment may be to the right. In still other embodiments, alignment be byte-aligned within the register, but may not be aligned to the beginning of the subregister.

In step 3: A mask is applied to each subregister to clear artifacts from the shuffle in step 1. For example, in subregister 122 the last thirteen bits contain set bits, which are artifacts from copying the entire subregister 112 to subregister 122 in step 1. Thus, a mask is applied to register 122, clearing the last thirteen bits in subregister 122. Subregister 124 and subregister 126 may be similarly masked.

Therefore at the end of step 3, and as illustrated in FIG. 1, the first three fixed-width bit values stored in register 110 are unpacked in register 120, such that each value is copied into, and aligned with, its own subregister.

Serial Process

The pseudo code below describes an embodiment of performing the bunpk instruction on a scalar processor. While the pseudo code below illustrates an embodiment, other embodiments may omit, add to, reorder, and/or modify any portions described below.

```
tmp_bits = r1;
if (tmp_bits > 1*get_completer_val (sz)) {
    unsupported_format_fault ( );
}
tmp_num_datums = sizeof(s2) / get_completer_val (sz);
for (i=0; i < tmp_num_datums; i++) {
    tmp_start_pos = i * tmp_bits;
    tmp_lo_off = tmp_start_pos / 8;
    tmp_hi_off = (tmp_start_pos + tmp_bits) / 8);
    if (tmp_lo_off == tmp_hi_off) {
        tmp_res = get_1byte_simd (s1, tmp_lo_off);
        tmp_res = (tmp_res >> (tmp_start_pos % 8));
        tmp_res = (tmp_res & (~(-1 << tmp_bits)));
    }
    else {
        tmp_lo = get_1byte_simd (s1, tmp_lo_off);
        tmp_lo = (tmp_lo >> (tmp_start_pos % 8));
        tmp_lo_len = 8 - (tmp_start_pos % 8);
        tmp_hi = get_1byte_simd (s1, tmp_hi_off);
        tmp_hi_len = (tmp_bits - tmp_lo_len);
        tmp_res = (tmp_hi & (~(-1 << tmp_hi_len)));
        tmp_res = (tmp_res << tmp_lo_len) | tmp_lo;
    }
    set_szbyte_simd(s2, i, tmp_res);
}
```

In the pseudo code above, the least significant bit is the right most bit, and memory grows to the left. In the written description below, however, the least significant bit is the left most bit, and memory grows to the right. As shown in the pseudo code above, a serial process may be used to unpack a fixed-width-value bit-vector to a fixed-width-value byte vector. According to an embodiment, first, for each value, the bytes which the value spans may be retrieved. Second, the bytes where the value is not byte-aligned are shifted, such that the bits that represent the value are shifted to the least significant bits. Third, all bits that do not represent the value are masked or set to zero. Fourth, if the value spans more than one byte, the bytes may be joined.

As merely an example, assume five values, [A, B, C, D, E], each three bits wide, are stored in two contiguous eight-bit registers b1 and b2. By way of notation <aaa> shall be the 3-bit representation of the value A. Accordingly, in this example, b1 contains <aaabbbcc> and b2 contains <cdddeee0>. Accordingly, the following exemplary process may be carried out, in an embodiment. This example is in no way meant to be limiting. While this example discusses particular steps according to an embodiment, other embodiments may omit, add to, reorder, and/or modify any of the steps below, based, at least in part, on the employer, candidates available, and the particular methods used.

In step 1: An iterative loop is defined to iterate over each value in the bit-vector. For example, an iterative loop is defined such that an iteration value, iter, begins at zero and is iteratively incremented by three, since each value is three bits in this example.

In step 2: A low-byte is be determined. A low-byte may be determined by integer-dividing the current value of iter by the width of the destination byte in the byte-vector. For example, in the third iteration, to unpack C, represented by the last two bits in register b1, and the first bit in register b2, the low-byte may be determined by integer-dividing the current value of iter, which in this example is six, by the width of the destination byte, which in this example is eight. Thus, the low-byte for value C in this example is zero, since the integer-division of six by eight equals zero.

In step 3: A high-byte is determined. A high-byte may be determined by summing: the current value of iter, with the width of the packed value; and, integer-dividing the sum by the width of the destination byte in the byte-vector. For example, in the third iteration, which unpacks C, the high-byte may be determined by summing of the current value of iter by the width of the bit-value, which in this example equals nine; and, integer-dividing the sum by the width of the destination byte, which in this example is eight. Thus, the high-byte in this example is one, since the integer-divide of nine by eight equals one.

In step 4: If the low-byte is equal to the high-byte, then the whole value is stored within a single byte and the process proceeds to step 5. Alternatively, if the low-byte is less than the high-byte, then the value is partially represented in the low-byte and partially represented in the high-byte and proceeds to step 6.

In step 5: The value is unpacked from the low-byte. For example, if unpacking B from b1 to result register Res, then the contents of b1 may be stored in Res. Thus, Res would be <aaabbbcc>. Res may then be left-shifted by iter, which in this example is three. Thus, Res would be <bbbcc000>. A mask may then be created to remove the bits that do not represent B, by performing a bitwise NOT of the quantity, negative-one, right-shifted by the size B, which in this example is three. Thus, the mask would be <11100000>. Finally, the mask may be applied to Res by performing a bitwise AND between Res and the mask. Thus, Res would equal <bbbcc000>. Since the entire value was in the low-byte, control returns to process the next iteration.

In step 6: The value is unpacked. If the low-byte and the high-byte are the same byte, the value may be extracted from the low-byte alone. Alternatively, the bits that represent the value in the low-byte, the high-byte, and the bytes between, may be extracted and joined.

For example, in the third iteration, which unpacks C, the low-byte, b1, is loaded in a temporary register, TmpLow, which in this example is presumed to be the same size as b1. Specifically, TmpLow would contain <aaabbbcc>. TmpLow is shifted left by iter modulo the width of Reg, which in this case would be six bits. Thus, TmpLow would be <cc000000>.

The length of the bits used from TmpLow, denoted as TmpLowLength, is computed by computing the difference between the width of TmpLow and number of bits shifted left. Thus, TmpLowLength is equal to eight minus six, which equals two.

TmpHighLength is computed by computing the difference between the widths of the packed bits, which in this example is three, and the TmpLowLength. Thus, in this example, TmpHighLength is equal to three minus two, which equals one.

To unpack the bits in the high-byte, the high-byte, b2, is loaded in a temporary register, TmpHigh, which in this example is presumed to be the same size as b2. Specifically TmpHigh would contain <cdddeee0>.

A mask, TmpHighMask, is created by storing negative-one in a register and right-shifting TmpHighMask by TmpHighLength. Thus, TmpHighMask would be <10000000>.

The mask is applied to TmpHigh by performing a bitwise AND between TmpHigh and TmpHighMask. Thus, TmpHigh would be <c0000000>.

The final result is stored in a result register, Res, by right-shifting TmpHigh by TmpLowLength, and performing a bitwise OR between TmpLow and TmpHigh. Since, in this case, TmpLowLength equals two, after right-shifting TmpHigh by TmpLowLength, TmpHigh would be <00c00000>. Thus, after performing the bitwise OR, Res would be the product of <cc000000> OR <00c0000>, which is <ccc00000>.

Variable-Length Byte Unpack

A SIMD instruction, variable-length byte unpack ("vlbunpk"), may be used to unpack variable-length byte values into fixed-width bytes. To efficiently use some SIMD instructions, each value in a register may be stored in fixed-width bytes. Accordingly, this instruction may be used as an enabler for some subsequent SIMD processing by storing each variable-length byte value as a fixed-width byte value.

Specifically, executing this instruction stores each value, originally packed in a series of variable-length contiguous bytes in a SIMD register, into contiguous fixed-length subregisters in a SIMD register. For example, the values 1555343273, 59107, 44, and 15937781 may be represented in four bytes, two bytes, one byte, and three bytes, respectively. For example, [0x5CB4A7A9, 0xE6E3, 0x2C, 0xF330F5] may be loaded in a first SIMD register. After performing the vlbunpk instruction on the first register, each value may be represented in contiguous fixed-width subregisters. For example, [0x5CB4A7A9, 0x0000E6E3, 0x0000002C, 0x00F330F5], such that each value is stored in a separate contiguous SIMD subregister.

Since the length of each value in the original packed representation is variable, another register may contain a set of corresponding values that indicate the length of each variable-length packed value. Continuing with the example above, a separate register may contain four values, e.g., [4, 2, 1, 3], which are the byte-lengths of each corresponding variable-length value. The lengths for each of the values in this register may be defined, or based, on an operand or completer included with the instruction.

To ensure each of the packed variable-length values may be represented within the unpacked fixed-width representation, each value is represented with same number of bytes as the greatest value in the packed variable-length values. Thus, as exemplified above, the values 0x5CB4A7A9, 0xE6E3, 0x2C, and 0xF330F5 may each be represented using four bytes after executing the vlbunpk instruction, e.g., 0x5CB4A7A9, 0x0000E6E3, 0x0000002C, and 0x00F330F5.

In an embodiment, the instruction may take as operands: a first register that the unpacked fixed-length values will be stored in; a second register containing the variable-length byte values; and a third register with corresponding values that represent the number of bytes used to represent each packed variable-length value in the second register. Furthermore, a completer may be included to define the length of the resulting unpacked fixed-length values, and the number of bits needed to represent each value in the third subregister. For example:

vlbunpk4 s2=s1,r1

In the example instruction above, packed variable-length contiguously stored values in s1, with corresponding length values stored in r1, may be unpacked into fixed-width 4-byte representations stored in s2. For example, assume the packed variable-length representations of values [0x5CB4A7A9, 0xE6E3, 0x2C, 0xF330F5] are stored in register s1, and corresponding lengths [4, 2, 1, 3] are stored in register r1. Upon execution of this instruction, 4-byte representations of each value are stored in register s2, such that each of the values in [0x5CB4A7A9, 0x0000E6E3, 0x000000002C, 0x00F330F5] in s2 is stored in its own contiguous subregister. In other embodiments, other operands and completers may indicate how the values are unpacked or stored in a register or memory.

Exemplary Process

Figure 2:
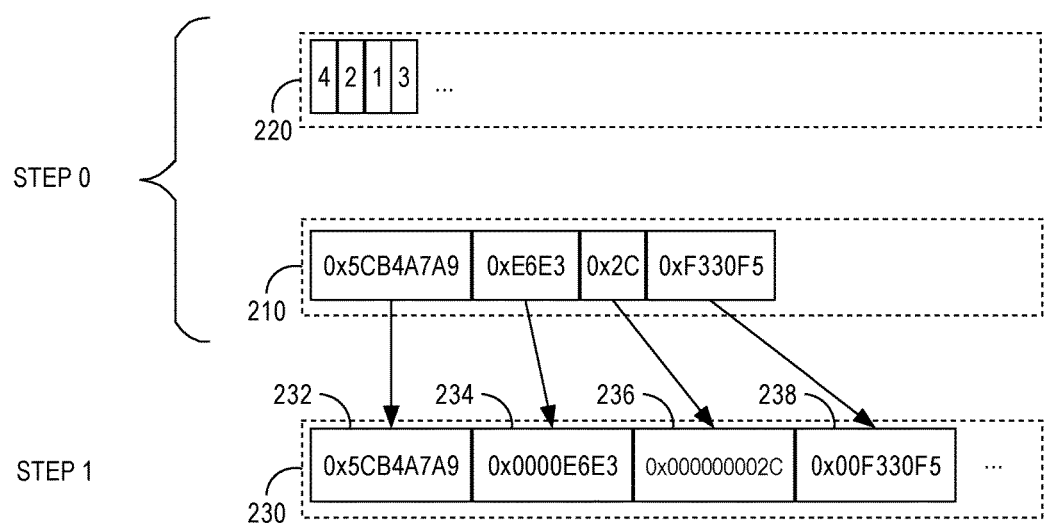
FIG. 2 illustrates a set of SIMD registers to perform a variable-length byte unpack instruction, in an embodiment.

FIG. 2 illustrates a set of SIMD registers in the process of performing a variable-length byte unpack instruction, in an embodiment. While FIG. 2 illustrates one embodiment for purposes of illustrating a clear example, other embodiments may omit, add to, reorder and/or modify any of the structures shown.

In step 0: In preparation for the vlbunpk instruction, the packed variable-length values are loaded into register 210, and the corresponding lengths are loaded into register 220. For example, SIMD register 210 contains four packed variable-length values, [0x5CB4A7A9, 0xE6E3, 0x2C, 0xF330F5].

SIMD register 220 contains the corresponding lengths for each of the values stored in register 210. Specifically, register 220 includes [4, 2, 1, 3]. In an embodiment the length of the values in register 220 are based on the completer of the instruction. For example, if the completer is set to four, as in the example above, then two bits may be used to describe all the possible lengths of each of the values in register 220. For example, [4, 2, 1, 3] may be represented as [<11>, <10>, <00>, <01>].

In step 1: The instruction is performed by storing the variable-length byte values in register 210, into register 230, according to the values stored in register 220. For example, register 230 comprises subregister 232, subregister 234, subregister 236 and subregister 238. The subregisters in register 230 may be any size; however, for purposes of giving a clear example, and in keeping with the examples above, the subregisters in register 230 are four bytes wide. A copy of the first four bytes of register 210 (based on the first two bits, <11>, in register 220), is stored in subregister 232. This copy is a perfect size match, and so nothing further may be required. Accordingly, subregister 232 may contain 0x5CB4A7A9, which is a four-byte representation of 0x5CB4A7A9.

A copy of next two bytes of register 210 (based on the next two bits, <10>, in register 220), are copied to subregister 234. However, when the two bytes from register 210 are copied to subregister 234, the value 127 is zero-extended to fit in the target subregister 234. Thus, subregister 234 may contain 0x0000E6E3. Alternatively, the value may be sign-extended. In yet another alternative, the bytes are merely copied into the first two bytes of subregister 234; but, subregister 234 may have been previously cleared, so as not to have any artifacts from previous values stored in subregister 234.

Likewise, the next byte of register 210 (based on the next two bits, <10>, in register 220) is copied into subregister 236, zero-extended. Also likewise, the next three bytes of register 210 (based on the next two bits, <01>, in register 220) is copied into subregister 238, zero-extended. Accordingly, subregister 236 and subregister 238 may contain [0x000000002C, 0x00F330F5].

Accordingly, after performing the instruction, register 230 may contain the unpacked fixed-length values [0x5CB4A7A9, 0x0000E6E3, 0x000000002C, 0x00F330F5], in contiguous subregisters 232 through 238.

Serial Process

The pseudo code below describes an embodiment of performing the vlbunpk instruction on a scalar processor, using the operands and completers defined in the sections above. While the pseudo code below illustrates an embodiment, other embodiments may omit, add to, reorder, and/or modify any portions described below.

```
tmp_num_codes = sizeof(s2) / get_completer_val(sz);
tmp_len_mask = (get_completer_val(sz) <= 4) ? 0x3 : 0xf;
tmp_len_shift = (get_completer_val(sz) <= 4) ? 2 : 4;
tmp_from_offset = 0;
for (i=0; i < tmp_num_codes; i++) {
    tmp_code_len = r1 & tmp_len_mask;
    tmp_code = extract_bytes_simd(s1, from_offset, tmp_code_len);
    set_szbyte_simd(s2, i, tmp_code);
    tmp_from_offset += tmp_code_len;
    r1 = r1 >> tmp_len_shift;
}
```

As merely an example, to explain the pseudo code above in further detail, the following description is given. The values and steps used are merely for purposes of illustrating a clear example, and are in no way intended to be limiting.

Assume for purposes of example, that s1 includes the variable-length values [A, B, C, D]. Furthermore assume that the lengths of each of the values in s1 is stored in r1 using a two-bit representation, e.g., [<11>, <01>, <00>, <01>], representing [4, 2, 1, 3].

Starting at the beginning of the first iteration through the for-loop: First, the length of the first packed value, A, is retrieved from r1 by masking all the bits except the first two. Second, the value, A, is extracted from s1 using an offset into s1, which in the first iteration is set to zero, and the two-bit value retrieved from r1, which is <11>, and maps to four. Third, the first four bytes of s1 are extracted and stored in s2 in a four-byte chunk, as designated by the completer sz in the set_szbyte_simd function.

The first iteration ends by preparing for the next iteration. Specifically, the offset into s1 is incremented by the number of bytes extracted. Thus, the offset is updated to four, since four bytes were retrieved in the first iteration. Furthermore, the two bits in r1 that represented the length of the first value in s1 are shifted out. Thus the next two-bit value, which corresponds to the second value in s1, sits at the front of r1 to be used in the next iteration.

Starting again at the beginning of the second iteration through the for-loop: First, the length of the second packed value, B, is retrieved from r1 by masking all the bits except the first two. Second, the value, B, is extracted from s1 using the offset into s1, which in this second iteration is set to four, and the two-bit value retrieved from r1, which is <01>, maps to two. Third, the next two bytes of s1 are extracted and stored in s2 in a four-byte, as designated by the completer sz in the set_szbyte_simd function.

The second iteration ends by preparing for the next iteration. Specifically, the offset into s1 is incremented by the number of bytes extracted. Thus, the offset is updated to six, since two more bytes were retrieved in the second iteration. Furthermore, the two bits in r1 that represented the length of the second value in s1 is shifted out. Thus the next two-bit value, which corresponds to the third value in s1, sits at the front of r1 to be used in the next iteration.

The third and fourth iterations proceed similarly as described above in the first two iterations. After all four iterations, the values A, B, C, D are unpacked and stored, [A, B, C, D], in s2 in fixed-length four-byte format.

BURST

A SIMD instruction, burst, may be used to decompress a run length encoded ("RLE") compressed bit-vector. An RLE compressed bit-vector is a bit-vector with a corresponding run-vector, such that each bit in the bit-vector has a corresponding run value in the run-vector. Each run value in the run-vector indicates how many bits the corresponding bit in the bit-vector should be extended. For example, if a compressed bit-vector <10> has a corresponding run-vector, [2, 6], then, in the decompressed bit-vector may be <11000000>.

This instruction may be complicated because, depending on the run values, writes into the result register or memory may be too large for a single instruction. Accordingly, the execution of a burst instruction may also update the operands of the instruction to reflect the current state, such that a subsequent execution of the burst instruction will resume where the previous execution left off.

Memory Form

In an embodiment, the burst instruction may take the following form, and may operate on a particular number of bytes each time the instruction is executed:

burst [r1]=r2, r3, r4

In the embodiment above, r1 is a pointer into memory indicating the byte at which the resulting decompressed bit-vector should be stored; r4 is the offset within the byte pointed to by r1, at which the resulting decompressed bit-vector should be stored. Furthermore, r2 is a pointer into memory indicating the byte at which the compressed bit-vector is stored. Further still, r3 is a pointer into memory indicating the byte at which the run-vector may be stored.

The following process may take place each time the burst instruction embodied above is executed:

In step 1: X numbers of bits from a compressed bit-vector are loaded, and X numbers of bytes from a corresponding run-vector are loaded. For example, r2 contains the address of a compressed bit-vector in memory, and r3 may contain the address of a corresponding run-vector in memory. Accordingly, the first two bytes (sixteen bits) of the bit-vector may be loaded into a first register and the first sixteen bytes of the run-vector are loaded into a second register. For purposes of illustrating a clear example, assume that <1010 1010 1010 1010> is loaded into the first register; and [2,3,2,3, 2,3,2,3, 2,3,2,3, 2,3,2,3] is loaded in the second register.

In step 2: The loaded bit-vector is decompressed based on the loaded corresponding run-vector. For example, the compressed bit-vector in the first register is decompressed based on the corresponding run-vector loaded in the second register. The resulting decompressed bit-vector may be stored in a third register. Thus, the third register may contain the decompressed bit-vector, <11 000 11 000 11 000 11 000 11 000 11 000 11 000>.

In step 3: The decompressed bit-vector is stored in memory. For example, the value loaded in the third register is stored in memory at the byte r1 addresses, offset by the value in r4.

In step 4: The operands are updated such that a subsequent execution of the burst instruction will "automatically": 1) load the next contiguously stored bits in the compressed bit-vector; 2) load the next contiguously stored corresponding run values in the run-vector; and 3) store the results contiguously with the results stored in step 3. The word "automatically" here means that the operands need not be updated before a subsequent burst instruction is executed. Thus, continuing with the current example: 1) r2 is incremented by two, to point to the next contiguous bits in the compressed bit-vector in memory; 2) r3 is incremented by sixteen, to point to the next contiguous corresponding run values in the run-vector in memory; and 3) r1 is incremented by five, to point to the next contiguous location in memory that the next resulting decompressed bit-vector should be stored; r4, however, remains unchanged since forty (the number of bits in five bytes) modulo eight is zero.

Accordingly, the operands of the burst instruction will reflect the current state, such that subsequent executions of the burst instruction will resume where the previous execution left off.

Register Form

In an embodiment, the burst instruction may take the following form, and may process up to a particular number of bytes each time the instruction is executed:

burst [r1]=r2, s1, r4

In the embodiment above, r1 is a pointer into memory indicating the byte at which the resulting decompressed bit-vector should be stored; r4 is the offset within the byte pointed to by r1, at which the resulting decompressed bit-vector should be stored. Furthermore, r2 is a register that contains the compressed bit-vector. And, s1 is a SIMD register holding the run values of the corresponding run-vector.

The following process may take place each time the burst instruction embodied above is executed. However, in this form, it is not always guaranteed that the burst instruction will complete the decompression for the bit-vector stored is r2. Accordingly, the following process may take different steps, than the process above, in order to resume execution where the previous execution left off:

In step 1: The loaded bit-vector is decompressed based on the loaded corresponding run-vector. For purposes of illustrating a clear example, assume that <1010 1010 1010 1010> is loaded into r2; and [2,3,2,3, 2,3,2,3, 2,3,2,3, 2,3,2,3] is loaded in s1. However, assume for purposes of explanation that the result register is four bytes wide. Thus, when the compressed bit-vector in r2 is decompressed based on the corresponding run-vector loaded in s1, a partial decompressed bit-vector may be stored in the result register. In this example, the full decompressed bit-vector cannot be stored in the result register since in this example the result register is four bytes wide, and the entire decompressed bit-vector is five bytes wide. Thus, the result register may contain the partially decompressed bit-vector, <11 000 11 000 11 000 11 000 11 000 11 000 11>.

In step 2: The partially decompressed bit-vector is stored in memory. For example, the value loaded in s1 is stored in memory at the byte r1 addresses, offset by the value in r4.

In step 3: The operands are updated such that a subsequent execution of the burst instruction will "automatically": 1) resume decompressing the bit-vector in r2 based on the corresponding run-vector in s1; and 2) the results will be stored contiguously with the results stored in step 2. The word "automatically" here means that the operands need not be updated before a subsequent burst instruction is executed to resume processing of the currently loaded compressed bit-vector. Thus, continuing with the current example: 1) [0,0,0,0, 0,0,0,0, 0,0,0,0, 0,3,2,3] is stored in s1 to reflect the compressed bits that were not fully decompressed; and 2) r1 is incremented by four, to point to the next contiguous location in memory that the next resulting decompressed bit-vector should be stored; r4, however, remains unchanged since thirty-two modulo eight is zero.

Accordingly, the operands of the burst instruction will reflect the current state, such that subsequent executions of the burst instruction will resume where the previous execution left off.

Hardware View

Figure 3:
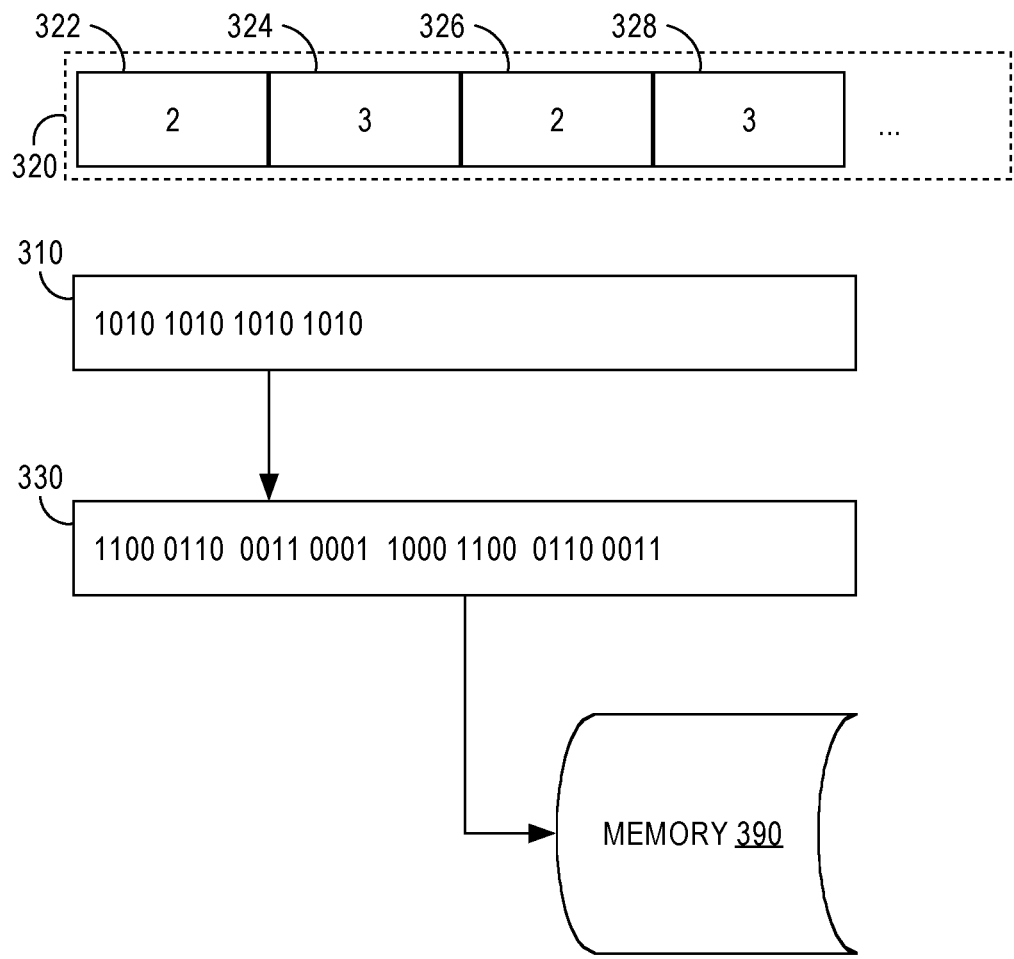
FIG. 3 illustrates a set of SIMD registers to perform the Burst instruction, in an embodiment.

FIG. 3 illustrates a set of registers used in the register to perform of the burst instruction, in an embodiment. While FIG. 3 illustrates one embodiment for purposes of illustrating a clear example, other embodiments may omit, add to, reorder and/or modify any of the structures shown.

Register 310 corresponds with register r2 and contains a compressed bit-vector comprising one or more bits in step 1. Specifically, register 310 contains the compressed bit-vector <1010 1010 1010 1010>.

SIMD register 320 corresponds to SIMD register s1 and contains the run-vector stored in s1. SIMD register 320 comprises a series of subregisters, such that each subregister stores a run value in the run-vector in step 1. Specifically, register 320 comprises: subregister 322, which contains the first run value, two; subregister 324, which contains the second run value, three; subregister 326, which contains the third run value, two; and subregister 328, which contains the fourth run value, three. As indicated, register 320 contains further subregisters not illustrated in FIG. 3.

Register 330 corresponds to the result register and contains the partially decompressed bit-vector at the end of step 1. Specifically, register 330 contains the first four bytes of the decompressed bit-vector <1100 0110 0011 0001 1000 1100 0110 0011>.

After performing the Burst instruction, register 330 may contain the decompressed bit-vector. Alternatively, the decompressed bit-vector may be stored, or partially stored, in memory 390.

Memory 390 may be on-chip cache located on a processor. Alternatively memory 390 may be off-chip cache, or main memory. Memory 390 may store full or partial decompressed bit-vectors stored register 330 as described in step 2 above.

Serial Process

The pseudo code below describes an embodiment of performing the burst instruction on a scalar processor, similarly using the operands and completers defined in the sections above as variables. While the pseudo code below illustrates an embodiment, other embodiments may omit, add to, reorder, and/or modify any portions described below.

```
if (memory_form) {
    tmp_in = load_2bytes(r2);
    for (i=0; i < 16; i++) {
        tmp_bit = tmp_in & 0x1;
        tmp_run_len = load_1byte (r3);
        burst_bit (tmp_bit, tmp_run_len, r1, r4);
        tmp_in >>= 1;
        r4 = (r4 + tmp_run_len) %
            BIT_VECTOR_CHUNK_SIZE_IN_BITS;
        r1 += tmp_run_len / BIT_VECTOR_CHUNK_SIZE_IN_BITS;
    }
} else {
    for (i=0; i < 16; i++) {
        tmp_bit = (r2 >> i) & 0x1;
        tmp_run_len = get_1byte_simd(s1, i);
        tmp_runs_written =
            burst_bit_8 (tmp_bit, tmp_run_len, r1, r4);
        r4 = (r4 + tmp_runs_written) %
            BIT_VECTOR_CHUNK_SIZE_IN_BITS;
```

-continued

```
        r1 += tmp_runs_written /
            BIT_VECTOR_CHUNK_SIZE_IN_BITS;
        if (tmp_runs_written != tmp_run_len)
            set_1byte_simd (s1, i, tmp_run_len - tmp_runs_written);
            return;
        } else {
            set_1byte_simd (s1, i, 0);
        }
    }
}
```

Ones Index

A SIMD instruction, onesidx, may be used to return the index of each bit set to one in a bit-vector. For example, if an operand contains the bit-vector <1000 0100 0111 0000>, then upon successful completion of the onesidx, a SIMD register may contain the index of each bit set to one in each subregister, e.g., [0, 5, 9, 10, 11].

This instruction may be complicated because, depending on the number of bits set to one, writes into the result register may be too large for a single instruction. Accordingly, the execution of a onesidx instruction may also update the operands of the instruction to reflect the current state, such that a subsequent execution of the onesidx instruction will resume where the previous execution left off.

Register Form

In an embodiment, the onesidx instruction may take the following form, and may find up to a particular number of indexes each time the instruction is executed:

onesidxsz.btype s1=r1, r2, r3

In the embodiment above, the register r1 may be the byte address in memory to begin searching a bit-vector, and r2 may be the offset with the byte r1 points to, to begin searching. The SIMD register s1 may include a series of subregisters, each of which may store an index value. The byte size of each subregister in s1 may be defined by the sz completer. The register r3 may contain the number of indexes found during execution. The btype completer may be the upper bound on the number of bytes to be searched. For example, "cache" may indicate that an entire cache line, starting at the byte r1 points to, should be searched. Similarly, "page" may indicate that an entire page, starting at the byte r1 points to, should be searched. For example, onesidxl.cache s1=r1, r2, r3, may instruct the processor to: 1) search the bits in memory starting at the byte in memory that r1 addresses, offset by the value stored in r2, through to the end of the cache line; 2) store the index of each bit set to one in a one-byte subregister located in s1; and 3) store the number of indexes found in r3. In other embodiment completer btype may be a number indicating the number of bytes to be searched.

In this embodiment, execution of the onesidx instruction may terminate if either s1 is filled to capacity or the the bits in the bit-vector are searched. Thus, it is not always guaranteed that the onesidx instruction will complete the search of the bit-vector in memory. Accordingly, the following process may take place each time the onesidx instruction embodied above may be executed:

In step 1: The bit-vector is loaded from memory into a first register. For purposes of illustrating a clear example, assume that <1000 0100 0111 0000> is loaded into a first register, based on the memory address stored in r1.

In step 2: The loaded bit-vector is searched, starting at the offset stored in r2; the indexes are stored in a SIMD register; and the number of indexes found is updated. For purposes of explanation, assume that r2 is set to zero, the SIMD register, s1, is one four bytes long and each subregister is one byte. As the bit-vector in the first register is searched, the index of each bit set to one is stored in a subregister in s1, until s1 is full. Furthermore, each index stored in s1 increments the value in r3. Since s1 is not wide enough to hold all the index values, step 2 terminates when [0, 5, 9, 10] is stored in s1, and the value four is stored in r3.

In step 3: The operands r1 and r2 are updated, such that a subsequent execution of the onesidx instruction "automatically" resumes indexing the bit-vector in memory. Here, "automatically" here means that that the operands need not be updated before a subsequent onesidx instruction is executed to resume processing of the bit-vector stored in memory. Thus, continuing with the example, r1 is incremented by two, in order to point to the byte where searching terminated. Furthermore, r2 is set to three, to indicate that the fourth bit where searching should be resumed.

Accordingly, the operands of the onesidx instruction will reflect the current state, such that subsequent execution of the onesidx instruction will resume where the previous execution left off.

In an embodiment, an operand may indicate where in memory the indexes stored in s1 should be stored. Furthermore, the operand may be updated in step 3, such that in subsequent executions the index values are contiguously stored automatically.

In another embodiment, the bit-vector may reside in r1. Accordingly, the value stored in r2 may indicate which bit in r1 searching should begin. Furthermore, at the end of step 3, r2 may be updated, such that subsequent execution of the onesidx instruction will resume where the previous execution left off.

Hardware View

Figure 4:
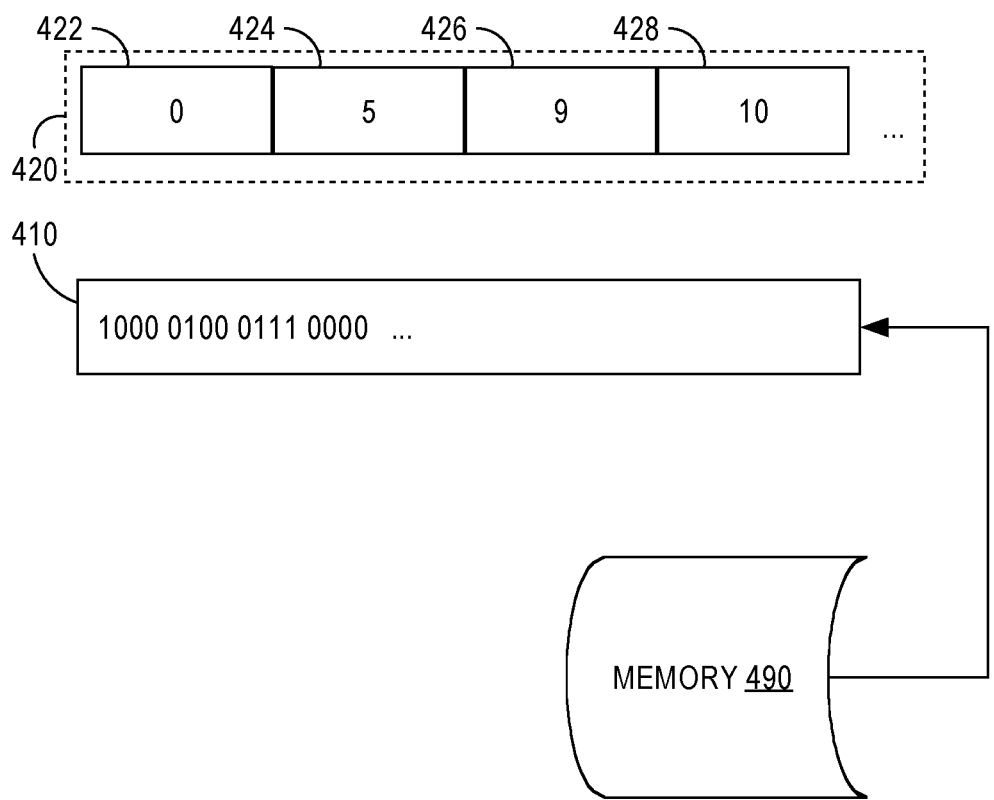
FIG. 4 illustrates a set of SIMD registers to perform a OnesIdx instruction, in an embodiment.

FIG. 4 illustrates a set of SIMD registers to perform the onesidx instruction, in an embodiment. While FIG. 4 illustrates one embodiment for purposes of illustrating a clear example, other embodiments may omit, add to, reorder and/or modify any of the structures shown.

SIMD register 410 may contain a bit-vector comprising one or more bits loaded from memory. In keeping with the example above, register 410 includes the bit-vector <1000 0100 0111 0000>. As indicated, register 410 may contain more bits, but those bits are not illustrated in this example.

SIMD register 420 corresponds to s1 in the example above and may be series of subregisters, such that the value stored in each subregister may be the offset of a bit set to one in register 410. Specifically, register 420 comprises subregister 422, subregister 424, subregister 426, and subregister 428, which are the offsets for the first four bits in register 410 set to one, respectively. In keeping with the example above, after performing the onesidx instruction, register 420 may contain offset values [0, 5, 9, 10], based of one or more bits set to one in register 410. Specifically, the values 0, 5, 9, and 10, are stored in subregister 422, subregister 424, subregister 426, and subregister 428, respectively.

Memory 490 may be on-chip cache located on the SIMD processor. Alternatively memory 490 may be off-chip cache, or main memory. Memory 490 may contain the bit-vector loaded into register 410, as described in step 1 above.

Scalar Process

The pseudo code below describes an embodiment of performing the onesidx instruction on a scalar processor, using the similarly using the operands and completers defined in the sections above as variables. While the pseudo code below illustrates an embodiment, other embodiments may omit, add to, reorder, and/or modify any portions described below.

```
r3 = 0;
for (i=0; i < get_completer_val(btype); i++) {
    tmp_byte = load_1byte(r1);
    if (i == 0) {
        tmp_byte = (tmp_byte >> r2) << r2;
        r2 = 0;
    }
    for (j=0; j < 8; j++) {
        if (tmp_byte & 0x1) {
            set_szbyte_simd(s1, r3, r2);
            r3 += 1;
            if (r3 == (sizeof(s1) / get_completer_val(sz))) {
                r2 = (r2 + 1) % 8;
                r1 = ((r2 == 0) ? r1 + 1 : r1);
                return;
            }
        }
        tmp_byte >> 1;
        r2 += 1;
    }
    r1 += 1;
}
r2 = 0;
```

Gatherb

A SIMD instruction, gatherb, may be used to fetch the value of bits stored in a bit-vector indexed by an index-vector. The results may be stored many different formats. For example, the result could be a bit-mask, wherein each bit represents the value of the corresponding bit fetched in the bit-vector, and zero otherwise. Alternatively, the result may be a series of subregisters where each subregister indicates the value of the corresponding bit fetched.

In one embodiment, the gatherb instruction may include three operands. The first operand may contain an input bit-vector. The second operand may contain an index-vector. And, the third operand may contain the result after the gatherb instruction has been executed.

Register Mask Form

In an embodiment, upon execution of the gatherb instruction, a bit mask may be stored which describes the values of the bits fetched. Furthermore, the gatherb instruction may take the following form:

gatherbsz r2=s1, r1

Specifically, in the embodiment above, r1 may be a register that stores a bit-vector. The register s1 may be a SIMD register, which may contain the index-vector, such that each subregister in s1 may contain an index value. The completer sz may indicate the size of each subregister in s1. The resulting bit-mask is stored in r2.

For example, assume that the bit-vector <0101 1100 1110 0001> is loaded in r1; the index-vector [1, 5, 10, 13] is loaded in s1, and the size of each subregister in s1 is one byte; and a bit-mask <0000 0000 0000 0000> is loaded in r2. Upon execution of gatherb1 r2=s1, r1, the values of the bits in the bit-vector, at the indexed locations, are copied into the corresponding bits in r2. Thus, r2 may contain the bit-mask <0100 0100 0010 0000>. In an embodiment, r2 may be cleared as an initial step when executing the gatherb instruction, such that artifacts from previously stored bits in r2 are cleared before storing copies of the indexed bits in r2.

Register Form

In an embodiment, upon execution of the gatherb instruction, the bit values stored in the bit-vector, indexed by the index-vector, may be stored, sign extended, in a series of subregisters corresponding to each index value in the index-vector. Furthermore, the gatherb instruction may take the following form:

gatherb.cmb s2=s1, r1

Specifically, in the embodiment above, r1 may be a register that stores a bit-vector. The register s1 may be a SIMD register, which may contain the index-vector, such that each subregister in s1 may contain an index value. The register s2 may be a SIMD register, which may contain a series of subregisters, which each correspond to a subregister in s1. The completer cmb may specify both the length of the subregisters in s1 and s2. Thus, the completer cmb may contain two numerals the first numeral indicating the size of s1 and the second numeral indicating the size of s2.

In one embodiment the numerals in the smb completer may be "b," "w," or "d," such that "b" may indicate a byte size of one, "w" may indicate a byte size of two, and "d" may indicate a byte size of four. Other numerals or formats may be used in other embodiments. For example, gatherbwd s2=s1, r1, may indicate that the subregisters in s1 are each two bytes, and the subregisters in s2 are each four bytes.

For purposes of illustrating a clear example, assume that the bit-vector <0101 1100 1110 0001> is loaded in r1; the index-vector [1, 5, 10, 13] is loaded in s1. Upon execution of gatherbbb r2=s1, r1, the values of the bits at the indexed locations are copied into s2, sign extended. Thus, s2 may contain [<1111 1111>, <1111 1111>, <1111 1111>, <0000 0000>], such that each bit-vector is stored in contiguous 1-byte subregisters in r2.

Hardware View

Figure 5:
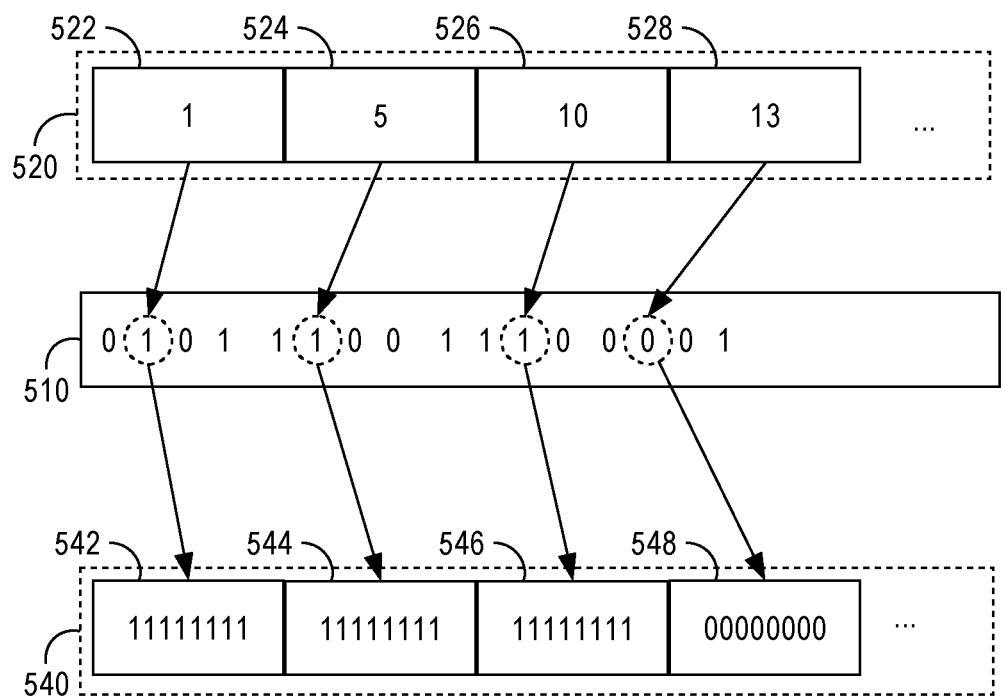
FIG. 5 illustrates a set of SIMD registers and steps to perform a GatherB instruction, in an embodiment.

FIG. 5 illustrates a set of registers in the register form of the gatherb instruction, in an embodiment. While FIG. 5 illustrates one embodiment for purposes of illustrating a clear example, other embodiments may omit, add to, reorder and/or modify any of the structures or steps shown.

Register 510 corresponds with register r1 and contains the bit-vector stored in r1. Therefore, in this example, register 510 contains the bit-vector <0101 1100 1110 0001>.

SIMD register 520 corresponds to SIMD register s1 and contains the index-vector stored in s1. SIMD register 520 comprises a series of subregisters, each one byte wide as indicated by the completer, such that each subregister stores an index value in the index-vector. Specifically, register 520 comprises subregister 522, which contains the first index value, one; subregister 524, which contains the second index value, five; subregister 526, which contains the third index value, ten; and subregister 328, which contains the fourth index value, thirteen. As indicated, register 520 may contain further subregisters not illustrated in FIG. 5.

SIMD register 540 corresponds to SIMD register s2 and contains the values stored in s2. SIMD register 540 comprises a series of subregisters, each one byte wide as indicated by the completer, such that after the gatherb instruction has executed, each subregister stores the sign-extended value of the bit in register 510 indexed by the respective index value in register 520. Specifically, subregister 542 contains the sign-extended value, <1111 1111>, of the second bit in register 510, based on the corresponding index value in subregister 522. Subregister 544 contains the sign-extended value, <1111 1111>, of the sixth bit in register 510, based on the corresponding index value in subregister 544. Subregister 546 contains the sign-extended value, <1111 1111>, of the eleventh bit in register 510, based on the corresponding index value in subregister 546. Subregister 548 contains the sign-extended value, <0000 0000>, of the fourteenth bit in register 510, based on the corresponding index value in subregister 548. As indicated, register 540 may contain further subregisters not illustrated in FIG. 5.

Alternative SIMD Implementation

Alternatively, the following SIMD implementation may be used. The method below may take as input 1) a vector of codes, and b) a single SET, where a SET may be a bit-vector packed with contiguous values. For example, for a bit-vector of 5-bit codes, each code may represent a bit in the SET. Therefore, the SET may, in an example, contain 2^5=32 bits.

Specifically, based on the size of the SIMD register, and the bit-width of the codes, either a first method, Algorithm A may be performed, or a second method, Algorithm B may be performed:

1. For a SIMD register that is N bits wide, wherein N may be 128, 256, or more;
2. Determine the length of the codes to be with K bits, e.g. 5 bit codes;
3. If 2^K is <=N, then Algorithm A may be used, otherwise algorithm B may be used.

Algorithm A:

1. Duplicate the set S (which is of size 2^K) into N/(2^K) partitions in a SIMD register, for which the splat operation may be used. Suppose that number is P (i.e. P partitions are used in the register). So if K=5 bits, and N=256, then P=256/32=8.
2. Load P K-bit codes and store the codes in a SIMD register so that the codes are properly aligned within the respective partitions.
3. Use variable-shift to shift each duplicated set by the K-bit code to get the bit targeted in the little-endian position.
4. MOVEMASK to get the bits targeted into a bit-mask and then copy to a bit-vector.

Algorithm B:

1. Load the codes into a SIMD register, similar to step (2) above.
2. Divide each partition by eight to get the byte-offset where the bit is located in the SET.
3. Perform a GATHER instruction to fetch the bytes from the SET, this operations fetches each byte in parallel.
4. Perform a MOD operation of values in step (1) to get the bit offset, i.e., the bit position in the byte where the target bit we want is located.
5. Perform a variable-shift using (4) and (3) to shift the bit to the low-end position.

And, 6. MOVEMASK to take the eight 1-bit values in the 256-bit register computed from step (3) and copy to bit-vector.

Below are two example using the two algorithms previous described:

1) Splat the dictionary across 32-bit partitions in a 256-bit SIMD register, wherein a splat copies a set of bits into each subregister. Since the SET is 32-bits wide, eight copies of the SET are stored in the SIMD register. 2) Load eight 5-bit codes in a SIMD register, so that each code is aligned on a 32-bit boundary in the 256-bit register, and perform: a)

SIMD LOAD; b) SHUFFLE, to get the codes in 32-bit partitions; c) Variable-Right-Shift, to shift each code to the right so that each code is aligned on the low-end of the 32-bit partition; and d) AND, mask out upper bits in each partition, so that you're just left with the code. 3) Next, apply variable-shift using the SET register from step (1) with the index register from step (2). The indexed bit is stored in the low end bit position of each 32-bit partition. 4) MOVE-MASK to take the eight 1-bit values in the 256-bit register computed from step (3) and copy to the bit-vector.

Alternatively, for higher data widths, e.g. 10-bit dictionary codes or more, which may be wider than the size of the SIMD subregisters the following method may be performed: 1) Load the codes into a SIMD register, similar to step (2) above. 2) Divide each partition by eight to get the byte-offset where the bit is located in the SET. 3) Perform a GATHER instruction to fetch the bytes from the SET, this operations fetches each byte in parallel. 4) Perform a MOD operation of values in step (1) to get the bit offset, i.e., the bit position in the byte where the target bit we want is located. 5) Perform a variable-shift using (4) and (3) to shift the bit to the low-end position. And, 6) MOVEMASK to take the eight 1-bit values in the 256-bit register computed from step (3) and copy to bit-vector.

Bit-Vector Comparison Result

A SIMD instruction, BitVecCmpRes, may be used to compare two value-vectors stored in two SIMD registers. Specifically, each subregister in the first SIMD register is compared to the corresponding subregister in the second SIMD register. The output may be a space efficient bit-vector stored in a result register.

In addition, in an embodiment, an offset may be included that indicates the offset within the result register the resulting bit-vector should be stored. Having an offset may allow the results of several BitVecCmpRes executions to be saved in the same bit-vector.

In an embodiment, the BitVecCmpRes instruction may take the following form:

BitVecCmpResSZ r1=s1, s2, r2

Specifically, in the embodiment above, the register s1 may be a SIMD register that contains a first value-vector, wherein the values in the first value-vector are stored a series subregisters in s1. The register s2 may be a SIMD register that contains a second value-vector, wherein the values in the second value-vector are stored a series subregisters in s2. Each subregister in s1 has a corresponding subregister in s2 and vice versa. The completer SZ may indicate the size of each subregister in s1 and s2. The register r1 may be a register that contains the resulting bit-vector, wherein each bit in the bit-vector corresponds to corresponding subregisters is s1 and s2. Furthermore, each bit in the bit vector is set to one if the values in the corresponding subregisters in s1 and s2 match, and zero otherwise. The register r2 may contain the offset from which the resulting bit-vector should be stored in r1.

For purposes of illustrating a clear example, assume that the value-vector in s1 contains [98, 62, 21, 16] and the value-vector in s2 contains [62, 62, 21, 46]. Further assume that the value loaded in r2 is zero. Upon execution of the BitVecCmpRes1 r1=s1, s2, r2, the resulting bit-vector, <0110>, may be stored in r1.

Further, assume that the values in s1, s2, and r2 are updated, such that s1 contains [14, 24, 12, 58], s2 contains [22, 76, 48, 58], and r2 contains the value four. After BitVecCmpRes1 r1=s1, s2, r2 is executed a second time, r1 may contain the bit-vector <0110 0001>. The first four bits in the bit-vector stored in r1 are not clobbered by the second execution because the resulting bits from the second execution were offset by four.

Hardware View

Figure 6:
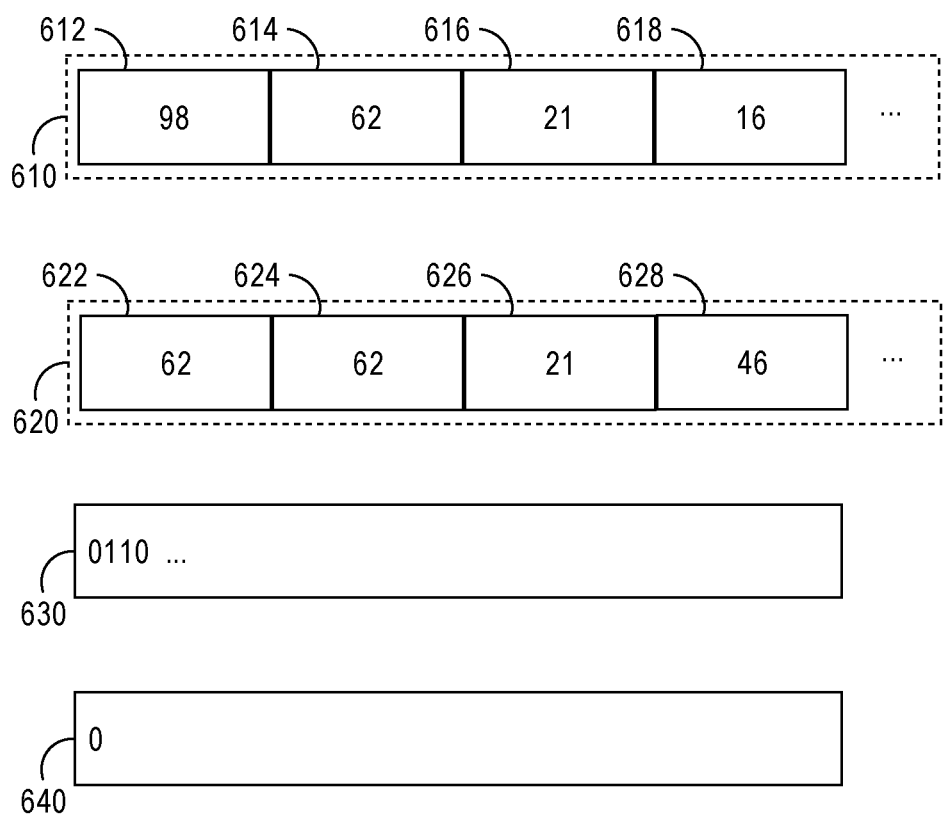
FIG. 6 illustrates a set of SIMD registers to perform a BitVecCmpRes instruction, in an embodiment.

FIG. 6 illustrates a set of registers used in conjunction with the BitVecCmpRes instruction, in an embodiment. While FIG. 6 illustrates one embodiment for purposes of illustrating a clear example, other embodiments may omit, add to, reorder and/or modify any of the structures or steps shown.

SIMD register 610 corresponds to SIMD register s1 and contains the value-vector stored in s1 before the first execution of the BitVecCmpRes instruction. SIMD register 610 comprises a series of subregisters, each of which is one byte as indicated by the completer, such that each subregister stores a one value in the first value-vector. Specifically, register 610 comprises subregister 612, which contains the first value, ninety-eight; subregister 614, which contains the second value, sixty-two; subregister 516, which contains the third value, twenty-one; and subregister 618, which contains the fourth value, sixteen. As indicated, register 610 may contain further subregisters not illustrated in FIG. 6.

SIMD register 620 corresponds to SIMD register s2 and contains the value-vector stored in s2 before the first execution of the BitVecCmpRes instruction. SIMD register 620 comprises a series of subregisters, each of which is one byte as indicated by the completer, such that each subregister stores a one value in the second value-vector. Specifically, register 620 comprises subregister 622, which contains the first value, sixty-two; subregister 624, which contains the second value, sixty-two; subregister 626, which contains the third value, twenty-one; and subregister 628, which contains the fourth value, forty-six. As indicated, register 620 may contain further subregisters not illustrated in FIG. 6.

Register 630 corresponds with register r1 and contains the bit-vector stored in r1. Therefore, in this example, register 610 contains the bit-vector <0110> at the end of the first execution, as discussed above.

Register 640 corresponds with register r2 and contains the value stored in r2. Therefore, in this example, before the first execution of the BitVecCmpRes instruction, register 640 contains the value zero, as discussed above.

Various Other Operations

In an alternative embodiment, a completer may also designate the type of comparison made between corresponding subregisters. For example:

BitVecCmpResSZ.gt r1=s1, s2, r2,

In the example above, the operands and SZ completer may be used similarly as discussed above. However, in this example, each bit in the bit vector is set to one if the values in the corresponding subregisters in s1 are greater than s2, and zero otherwise. Likewise, any comparative operator may be used, e.g., less than ("lt"), less than or equal to ("tle"), greater than or equal to ("gte"), equal to ("eq"), not equal to ("neq"), and so on.

Variations

Some of the embodiments illustrated above each subregister may be four, eight, or sixteen bits wide. Other embodiments may include other widths, including, but in no way limited to four bits, eight bits, thirty-two bits, sixty-four bits.

In many examples, subregisters may be one byte. However, subregisters may be larger or smaller than one byte. Furthermore, a default width, an operand, or a completer may be used to define the width of the subregisters for a particular instruction.

In some of the embodiments illustrated and discussed above, the least significant bits were illustrated on the left side of registers or memory, the sign bit was illustrated on the right side, and bits or bytes were padded or shifted to one particular side. However, the examples included above are not intended to be limiting. The instructions discussed above may be implemented on many various hardware configurations that are different than those illustrated.

While the methods described above may be focused on a SIMD architecture, these methods may also be implemented on a scalar or other non-SIMD processor. The methods may also be included as part of an application programming interface. Furthermore the methods may implemented as an intrinsic, which may be a function a compiler recognizes and replaces with a particular block of assembly or machine code. Further still, one or more instructions may be stored on one or more non-transitory computer-readable mediums, which when executed by one or more processors, may cause one or more of the methods described herein to be performed.

In many of the examples, a SIMD register comprises four subregisters. This is not intended to be limiting in any way. SIMD registers may comprise more or fewer subregisters, all of which may be varying widths.

In an embodiment memory grows is the address increases. In another embodiment memory grows as the address decrements. Accordingly, any of the instructions may also include a completer or operand that indicates which direction memory is grows.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
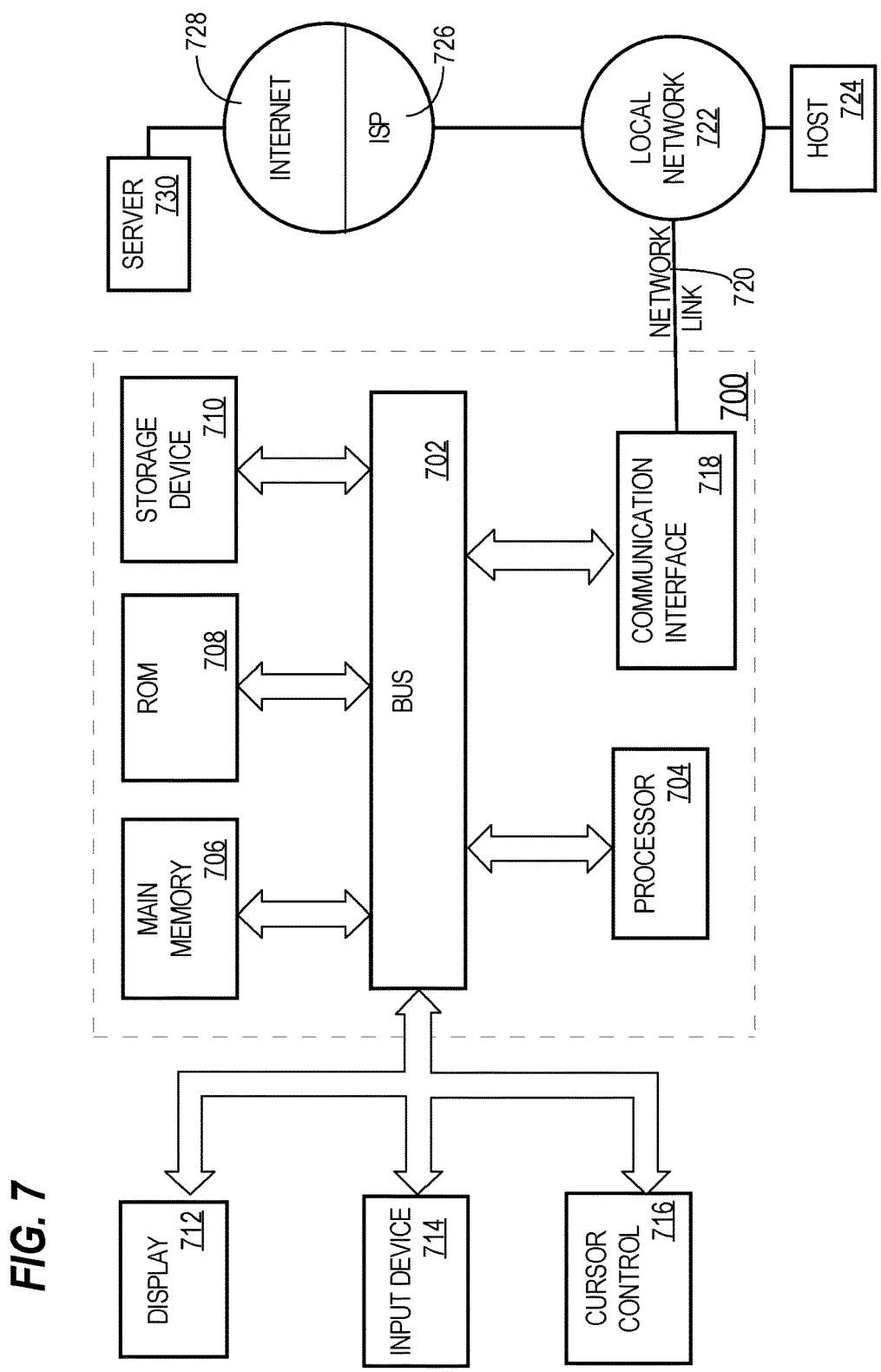
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A processor configured to fetch values of bits stored in a bit-vector that are indexed by an index-vector, comprising:
   a first SIMD register; and
   a second SIMD register;
   wherein the index-vector comprises a contiguous series of codes;
   wherein each code in the index-vector represents an index value of a bit in the bit-vector;
   the processor is configured to respond to a set of instructions to fetch values of bits stored in the bit-vector that are indexed by the index-vector by:
      establishing a first plurality of partitions within the first SIMD register;
      establishing a second plurality of partitions within the second SIMD register;
      wherein each partition in the first plurality of partitions has a corresponding partition in the second plurality of partitions;
      loading a copy of the bit-vector into each partition of the first plurality of partitions;
      loading the second plurality of partitions with contiguous codes from the index-vector;
      wherein loading the second plurality of partitions with contiguous codes comprises loading each partition of the second plurality of partitions with a single code from the index-vector;
      performing a variable shift on the copy of the bit-vector that is loaded in each partition of the first plurality of partitions;
      wherein the amount of the variable shift on each copy of the bit-vector is based on the code stored in the partition, of the second plurality of partitions, that corresponds to the partition, of the first plurality of partitions, in which the copy is stored;
      for each partition in the first plurality of partitions, causing a bit at a particular position within the partition to be moved to an output bit-vector.

2. The processor of claim 1, wherein the processor is further configured such that performing the variable shift on the copy of the bit-vector that is loaded in each partition of the first plurality of partitions places a targeted bit of each copy of the bit-vector in the little endian position of each partition of the first plurality of partitions.

3. The processor of claim 1, wherein the processor is further configured such that causing the bit at the particular position within the partition to be moved to the output bit-vector involves performing a final move mask operation to gather the targeted bits in each partition.

4. A processor configured to fetch values of bits stored in a bit-vector that are indexed by an index-vector, comprising:
   a first SIMD register; and
   a second SIMD register;
   wherein the index-vector comprises a contiguous series of codes;
   wherein each code in the index-vector represents an index value of a bit in the bit-vector;
   wherein the processor is configured to respond to a set of instructions to fetch values of bits stored in the bit-vector that are indexed by the index-vector by:
      establishing a first plurality of partitions within the first SIMD register;
      loading the first plurality of partitions with contiguous codes from the index-vector;

wherein loading the first plurality of partitions with contiguous codes comprises loading each partition of the first plurality of partitions with a single code from the index-vector;

determining a plurality of byte offsets by dividing the codes in each partition of the first plurality of partitions by 8;

based on the plurality of byte offsets, loading a corresponding plurality of bytes from the bit-vector into a second plurality of partitions of the second SIMD register;

wherein each partition in the first plurality of partitions has a corresponding partition in the second plurality of partitions;

based on the contiguous codes loaded in the first plurality of partitions, determining a target bit position for each byte in the plurality of bytes;

performing a variable shift on each byte, of the plurality of bytes, that is loaded in each partition of the second plurality of partitions;

wherein the amount of the variable shift on each byte of the plurality of bytes is based on the target bit position determined for each byte in the plurality of bytes;

for each partition in the second plurality of partitions, causing a bit at a particular position within the partition to be moved to an output bit-vector.

5. The processor of claim 4, wherein the processor is further configured to respond to a set of instructions to load the corresponding plurality of bytes from the bit-vector into a second plurality of partitions of the second SIMD register by performing a gather operation on the bit vector.

6. The processor of claim 4, wherein the processor is further configured to respond to a set of instructions to determine a target bit position for each byte in the plurality of bytes by performing a modulo by eight operation on the codes in each partition of the first plurality of partitions to obtain the target bit position for each byte in the plurality of bytes.

7. The processor of claim 4, wherein the processor is further configured such that performing the variable shift on each byte, of the plurality of bytes, that is loaded in each partition of the second plurality of partitions, further comprises shifting byte to place a targeted bit in the low-end position of each partition of the second plurality of partitions.

8. The processor of claim 4, wherein the processor is further configured such that causing a bit to at a particular position within the partition to be moved to an output bit-vector involves performing a final move mask operation to gather the targeted bits in each partition.

9. A processor configured to fetch values of bits stored in a bit-vector that are indexed by an index-vector, comprising:
a first SIMD register; and
a second SIMD register;
wherein the index-vector comprises a contiguous series of codes;
wherein each code in the index-vector represents an index value of a bit in the bit-vector;
wherein the processor implements multiple techniques for fetching values of bits stored in a bit-vector that are indexed by an index-vector;
wherein the multiple techniques include a first technique and a second technique;
wherein width of the SIMD registers is N bits;
wherein the number of bits in each code is K;

wherein the processor is configured to respond to a set of instructions to fetch values of bits stored in the bit-vector that are indexed by the index-vector by:
determining whether $2^K<=N$;
responsive to determining that $2^K<=N$, performing the first technique to fetching values of bits stored in the bit-vector that are indexed by the index-vector; and
responsive to determining that $2^K>N$, performing the second technique to fetch values of bits stored in the bit-vector that are indexed by the index-vector.

10. The processor of claim 9, wherein the processor is configured to respond to a set of instructions to perform the first technique to fetch values of bits stored in the bit-vector that are indexed by the index-vector by:
loading a copy of the bit-vector into each partition of a first plurality of partitions of the first SIMD register;
loading contiguous codes from the index-vector into each partition of a second plurality of partitions of the second SIMD register;
performing a variable shift on the copy of the bit-vector that is loaded in each partition of the first plurality of partitions based on the code stored in the partition, of the second plurality of partitions, that corresponds to the partition, of the first plurality of partitions, in which the copy is stored; and
for each partition in the first plurality of partitions, causing a bit at a particular position within the partition to be moved to an output bit-vector.

11. The processor of claim 9, wherein the processor is configured to respond to a set of instructions to perform the second technique to fetch values of bits stored in the bit-vector that are indexed by the index-vector by:
loading contiguous codes from the index-vector into each partition of a first plurality of partitions of the first SIMD register;
loading a corresponding plurality of bytes from the bit-vector into a second plurality of partitions of a second SIMD register based on the contiguous codes loaded in the first plurality of partitions;
performing a variable shift on each byte, of the plurality of bytes, loaded in each partition of the second plurality of partitions based on the contiguous codes loaded in the first plurality of partitions; and
for each partition in the second plurality of partitions, causing a bit at a particular position within the partition to be moved to an output bit-vector.

12. A method to fetch values of bits stored in a bit-vector that are indexed by an index-vector, comprising:
establishing a first plurality of partitions within s first SIMD register;
establishing a second plurality of partitions within a second SIMD register;
wherein each partition in the first plurality of partitions has a corresponding partition in the second plurality of partitions;
loading a copy of the bit-vector into each partition of the first plurality of partitions;
loading the second plurality of partitions with contiguous codes from an index-vector, wherein each code in the index-vector represents an index value of a bit in the bit-vector;
wherein loading the second plurality of partitions with contiguous codes comprises loading each partition of the second plurality of partitions with a single code from the index-vector;

performing a variable shift on the copy of the bit-vector that is loaded in each partition of the first plurality of partitions;

wherein the amount of the variable shift on each copy of the bit-vector is based on the code stored in the partition, of the second plurality of partitions, that corresponds to the partition, of the first plurality of partitions, in which the copy is stored;

for each partition in the first plurality of partitions, causing a bit at a particular position within the partition to be moved to an output bit-vector.

13. The method of claim 12, wherein performing the variable shift on the copy of the bit-vector that is loaded in each partition of the first plurality of partitions places a targeted bit of each copy of the bit-vector in the little endian position of each partition of the first plurality of partitions.

14. The method of claim 12, wherein causing the bit at the particular position within the partition to be moved to the output bit-vector involves performing a final move mask operation to gather the targeted bits in each partition.

15. A method to fetch values of bits stored in a bit-vector that are indexed by an index-vector, comprising:

establishing a first plurality of partitions within a first SIMD register;

loading the first plurality of partitions with contiguous codes from an index-vector wherein each code in the index-vector represents an index value of a bit in the bit-vector;

wherein loading the first plurality of partitions with contiguous codes comprises loading each partition of the first plurality of partitions with a single code from the index-vector;

determining a plurality of byte offsets by dividing the codes in each partition of the first plurality of partitions by 8;

based on the plurality of byte offsets, loading a corresponding plurality of bytes from the bit-vector into a second plurality of partitions of a second SIMD register;

wherein each partition in the first plurality of partitions has a corresponding partition in the second plurality of partitions;

based on the contiguous codes loaded in the first plurality of partitions, determining a target bit position for each byte in the plurality of bytes;

performing a variable shift on each byte, of the plurality of bytes, that is loaded in each partition of the second plurality of partitions;

wherein the amount of the variable shift on each byte of the plurality of bytes is based on the target bit position determined for each byte in the plurality of bytes;

for each partition in the second plurality of partitions, causing a bit at a particular position within the partition to be moved to an output bit-vector.

16. The method of claim 15, further comprising performing a modulo by eight operation on the codes in each partition of the first plurality of partitions to obtain the target bit position for each byte in the plurality of bytes.

17. The method of claim 15, wherein performing the variable shift on each byte, of the plurality of bytes, that is loaded in each partition of the second plurality of partitions, further comprises shifting byte to place a targeted bit in the low-end position of each partition of the second plurality of partitions.

18. A method for implementing a first technique and a second technique for fetching values of bits stored in a bit-vector that are indexed by an index-vector, comprising:

determining whether $2^K<=N$;

wherein K is the number of bits in each code of a set of contiguous codes in an index-vector;

wherein each code in the index-vector represents an index value of a bit in the bit-vector; and wherein N is a width of a first and a second SIMD registers;

responsive to determining that $2^K<=N$, performing the first technique to fetching values of bits stored in the bit-vector that are indexed by the index-vector; and responsive to determining that $2^K>N$, performing the second technique to fetch values of bits stored in the bit-vector that are indexed by the index-vector.

19. The method of claim 18, wherein performing the first technique to fetch values of bits stored in the bit-vector that are indexed by the index-vector comprises:

loading a copy of the bit-vector into each partition of a first plurality of partitions of the first SIMD register;

loading contiguous codes from the index-vector into each partition of a second plurality of partitions of the second SIMD register;

performing a variable shift on the copy of the bit-vector that is loaded in each partition of the first plurality of partitions based on the code stored in the partition, of the second plurality of partitions, that corresponds to the partition, of the first plurality of partitions, in which the copy is stored; and for each partition in the first plurality of partitions, causing a bit at a particular position within the partition to be moved to an output bit-vector.

20. The method of claim 18, wherein performing the first technique to fetch values of bits stored in the bit-vector that are indexed by the index-vector comprises:

loading contiguous codes from the index-vector into each partition of a first plurality of partitions of the first SIMD register;

loading a corresponding plurality of bytes from the bit-vector into a second plurality of partitions of a second SIMD register based on the contiguous codes loaded in the first plurality of partitions;

performing a variable shift on each byte, of the plurality of bytes, loaded in each partition of the second plurality of partitions based on the contiguous codes loaded in the first plurality of partitions; and for each partition in the second plurality of partitions, causing a bit at a particular position within the partition to be moved to an output bit-vector.

* * * * *

UNITED STATES PATENT AND TRADEMARK OFFICE
CERTIFICATE OF CORRECTION

PATENT NO. : 10,229,089 B2
APPLICATION NO. : 15/639110
DATED : March 12, 2019
INVENTOR(S) : Ganesh et al.

It is certified that error appears in the above-identified patent and that said Letters Patent is hereby corrected as shown below:

On the Title Page

Page 2, Column 2, Line 12, delete "retreived" and insert -- retrieved --, therefor.

In the Specification

Column 5, Line 27, delete "that that" and insert -- that --, therefor.

Column 14, Lines 48-49, delete "onesidxl.cache" and insert -- onesidx1.cache --, therefor.

Column 14, Line 58, delete "the the" and insert -- the --, therefor.

Column 15, Line 9, delete "2terminates" and insert -- 2 terminates --, therefor.

Column 15, Line 14, delete "that that" and insert -- that --, therefor.

In the Claims

Column 26, Line 51, Claim 12, delete "within s" and insert -- within a --, therefor.

Signed and Sealed this
Twenty-fifth Day of February, 2020

Andrei Iancu
*Director of the United States Patent and Trademark Office*